United States Patent

Mueller et al.

[11] Patent Number: 5,151,959
[45] Date of Patent: Sep. 29, 1992

[54] CONTROLLABLE INTEGRATED OPTICAL MACH-ZEHNDER INTERFEROMETER

[75] Inventors: Gustav Mueller; Lothar Stoll, both of Munich, Fed. Rep. of Germany

[73] Assignee: Siemens Aktiengesellschaft, Munich, Fed. Rep. of Germany

[21] Appl. No.: 744,898

[22] Filed: Aug. 14, 1991

[30] Foreign Application Priority Data

Sep. 28, 1990 [DE] Fed. Rep. of Germany ....... 4030755

[51] Int. Cl.$^5$ .............................................. G02B 6/26
[52] U.S. Cl. ................................... 385/50; 385/131
[58] Field of Search .................... 385/42, 39, 40, 41, 385/44, 45, 50, 129, 130, 131, 16

[56] References Cited

U.S. PATENT DOCUMENTS 5,004,447  4/1991  Soref ................................... 385/16
5,050,180  9/1991  Botez et al. ........................ 385/130

Primary Examiner—John D. Lee
Assistant Examiner—Phan T. Heartney
Attorney, Agent, or Firm—Hill, Van Santen, Steadman & Simpson

[57] ABSTRACT

An integrated-optical interferometer is formed of two strip waveguides integrated on a substrate. A strip waveguide section of the interferometer is designed as a controllable strip waveguide, and the strip waveguides are passive strip waveguides outside of the section. In order to guarantee a largely polarization-dependent function of this interferometer and of an optical switch realized therewith, the passive waveguides comprise a defined, different strip waveguide structure than the controllable strip waveguide.

17 Claims, 1 Drawing Sheet

5,151,959

CONTROLLABLE INTEGRATED OPTICAL MACH-ZEHNDER INTERFEROMETER

RELATED APPLICATION

The present application is related to the copending application of Mueller et al entitled "CONTROLLABLE INTEGRATED OPTICAL DIRECTIONAL COUPLER", Hill Case No. P-91,1579, U.S. Ser. No. 744,897, filed Aug. 14, 1991.

BACKGROUND OF THE INVENTION

The invention is directed to a controllable integrated-optical Mach-Zehnder interferometer formed of two strip waveguides integrated on a substrate, and as proposed in the earlier German patent application P 39 29 131.6 (GR 89 P 1730 DE), incorporated herein.

In the proposed interferometer, the pn-junction or pin-junction extends over the entire length of the two strip waveguides designed as a rib waveguide. These strip waveguides thus have a uniform waveguide structure, whereby the pn-junction or pin-junction is electrically controllable via electrical contacts only in the phase shifting section.

This interferometer can be operated as an optical switch that supplies an optical input signal to the one or to the other output of the switch dependent on an electrical control signal.

In the proposed interferometer, the function of this component is generally dependent on the polarization of the input signal, i.e. TE-polarized input signals are distributed differently onto the outputs than TM-polarized input signals with a given geometry.

SUMMARY OF THE INVENTION

It is an object of the invention to improve an interferometer of the above type such that a largely polarization-independent function of this interferometer and of an optical switch realized therewith is guaranteed.

This object is achieved with a controllable integrated-optical Mach-Zehnder interferometer according to the invention which has two strip waveguides. The strip waveguides have a defined width and are integrated on a substrate of semiconductor material and are defined by an undoped or an n-doped waveguiding layer associated with the substrate. The strip waveguides proceed side-by-side to one another in two coupling sections at such a slight distance from one another such that an optical wave guided in the waveguiding layer of one of the strip waveguides can couple over into the waveguiding layer of the other strip waveguide. In a phase shifting section lying between these two coupling sections, the two strip waveguides are arranged at a greater distance from one another in side-by-side relationship. This greater distance prevents an over-coupling of optical waves between the strip waveguides. At least one of the strip waveguides in the phase shifting section comprises a rib of semiconductor material which is arranged over the waveguiding layer and defines a width of the waveguide thereat. A pn-junction or a pin-junction which is electrically controllable via contacts is integrated in the region of the rib within the phase shifting section above or below the waveguiding layer, and wherein a transition from p-doped material in a direction towards n-doped or undoped material of a spacer layer between the junction and the waveguiding layer is arranged at a specified distance from the waveguiding layer. The p-doped material is situated at a side of this transition facing away from the waveguiding layer. Thus, a strip waveguide section is formed in the phase shifting section which comprises an electrically controllable pn-junction or pin-junction, thus forming an electrically controllable strip waveguide thereat. Strip waveguide sections situated outside of the electrically controllable strip waveguide form a passive strip waveguide. The passive strip waveguide has a strip waveguide structure which is free of a pn- or pin-junction.

In particular, the strip waveguide structures of the passive strip waveguides have the advantage that they are suitable for integration with the laser diode disclosed in the earlier German Patent Application P 40 14 234.5 (GR 90 P 1231 DE). Over and above this, they can be manufactured in a simple way from the strip waveguide structure of the electrically controllable strip waveguide by omitting or etching off upper layers.

DESCRIPTION OF THE PREFERRED EMBODIMENTS

Figure 1:
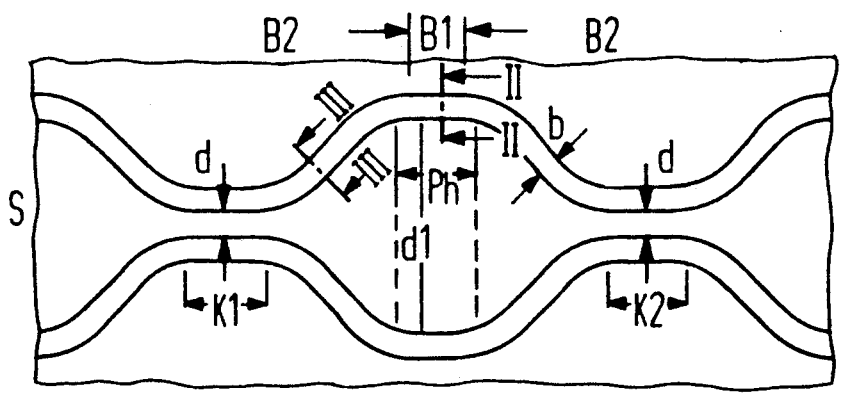
FIG. 1 is a plan view of an exemplary interferometer of the invention.

In the interferometer of FIG. 1, the strip waveguides WL1 and WL2 each having a defined width b, and which are integrated on the substrate S, are arranged at such a great distance d1 from one another in the phase shifting section Ph that an optical wave guided in the waveguiding layer of the one strip waveguide WL1 or WL2 does not couple over into the waveguiding layer of the other strip waveguide WL2 or WL1, respectively.

The strip waveguide section of a strip waveguide WL1 or WL2 which forms the electrically controllable strip waveguide is situated in the phase shifting section Ph and extends, for example, over the region B1. Outside of the region B1, i.e. in the region B2 to the left and right of the region B1, the strip waveguides WL1 and WL2 are passive strip waveguides.

In two coupling sections K1 and K2 to the left and right of the phase shifting section Ph, the strip waveguides WL1 and WL2 are positioned at such a slight distance d from one another and side-by-side that guided optical waves couple over in these coupling sections K1 and K2 between the strip waveguides WL1 and WL2, and can be overlaid on one another.

Figure 2:
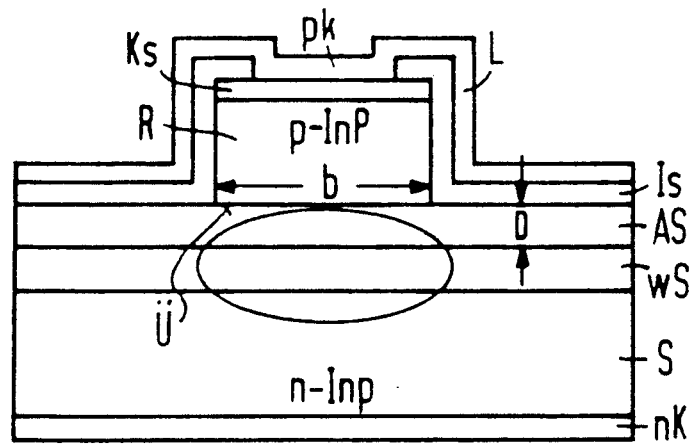
FIG. 2 is a section view along the section line II—II in FIG. 1 through the electrically controllable strip waveguide in the phase shifting section.

The strip waveguide structure of the controllable strip waveguide is shown in cross-section in FIG. 2. According to this structure, a waveguiding layer wS is applied on a substrate S. A spacer layer AS having the thickness D is situated on the waveguiding layer wS. The rib R, whose width b defines the width of the strip waveguide, is in turn applied onto this spacer layer AS.

The substrate S is composed of n-doped semiconductor material. The waveguiding layer wS is likewise composed of n-doped semiconductor material, whereby material and/or doping of this waveguiding layer wS are selected such that its refractive index is higher than that of the substrate S.

The spacer layer AS is composed of n-doped or of undoped semiconductor material which is selected such that its refractive index is lower than that of the waveguiding layer S.

The rib R is composed of p-doped semiconductor material.

The n-doped material of the substrate S and of the waveguiding layer wS, the undoped material of the spacer layer AS, and the p-doped material of the rib R define a pn-junction or pin-junction, whereby the transition Ü from p-doped material in the direction toward the n-doped or undoped material is arranged at the distance D from the waveguiding layer wS.

A highly p-doped contact layer Ks which is contacted to a metallic contact pK is situated on the surface of the rib R. Electrical lines L leading to this contact pK are brought in on an electrically insulating layer IS, for example an oxide layer which separates these lines L from the spacer layer AS and from the rib R.

The cooperating contact for the contact pK is applied on the underside of the substrate S and is referenced nK.

The substrate S and the rib R are composed, for example, of InP, whereas the waveguiding layer wS and the spacer layer AS are composed of InGaAsP. The material of the spacer layer AS can have a gap wavelength of 1.1 μm and the material of the waveguiding layer wS can have a gap wavelength of 1.25 μm.

The strip waveguide structure of the passive strip waveguide which is free of a pn-junction or a pin-junction can be constructed in various ways.

Figure 3A:
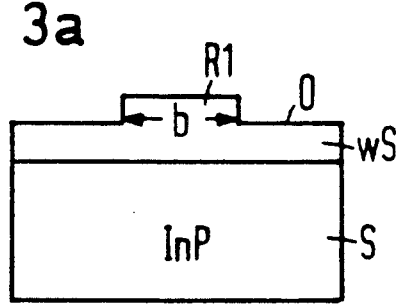
FIGS. 3a through 3d illustrate sectional views taken, for example, along the section line III—III in FIG. 1 through a passive strip waveguide of the interferometer of the invention, wherein various strip waveguide structures that are possible for such a passive strip waveguide are shown.
Figure 3B:
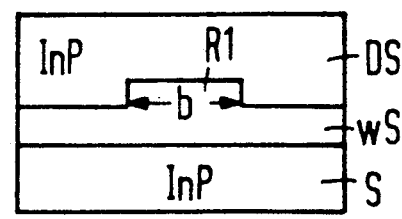

In the embodiments of FIGS. 3a and 3b, this structure is defined by a rib R1 forming a thicker region of the waveguiding layer wS composed of the n-doped or undoped semiconductor material, the width b of this rib R1 defining the width of the passive strip waveguide WL1 or WL2. The waveguiding layer wS at the surface O facing away from the substrate S is adjacent air or to some other uniform material, for example to the material of the substrate S.

In the embodiment of FIG. 3b, the structure comprises a strip-shaped, waveguiding layer wS whose width b defines the width of the passive strip waveguide. This strip-shaped, waveguiding layer wS is surrounded by the uniform material of the substrate. However, it can also be established such that, for example, the strip-shaped, waveguiding layer wS is formed on the surface of the substrate S and is covered by a cover layer composed of a uniform material or remains free. In this case, air or the other uniform material is adjacent at the strip-shaped, waveguiding layer wS and at the substrate S.

Figure 3C:
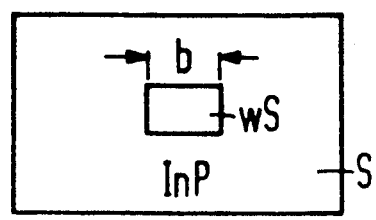

In the embodiment of FIG. 3C, the waveguiding layer wS is surrounded by the substrate and has a width b.

Figure 3D:
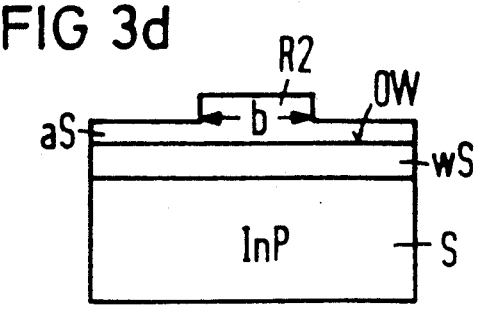

In the embodiment of FIG. 3d, the strip waveguide structure which is free of a pn-junction and a pin-junction is defined by a rib R2 which forms a thicker region of a further layer aS composed of a uniform material which is arranged on or over the waveguiding layer wS. The width b of this rib R2 defines the width of the passive strip waveguide WL1, WL2. The further layer aS at a surface OW facing away from the waveguiding layer wS is adjacent to air or to some other uniform material.

The directional coupler of the invention can be advantageously manufactured such that, first, the substrate together with the waveguiding layer wS, the spacer layer AS, and the rib R arranged thereon is manufactured in a traditional technology. The rib R remains in the region B1, whereby the insulating layer IS, the contact pK, and the electrical lines L are also realized in a traditional technology.

At least the rib R is removed in the region B2, for example by etching. One can also proceed such that no rib R is produced in the region B1, i.e. that this rib R is omitted from the very outset in this region B2.

For manufacturing the strip waveguide structures according to FIGS. 3a through 3c, the spacer layer AS is removed in the region B2, for example by etching. One can also proceed such that here this spacer layer AS is not produced in the regional B2, i.e. is omitted from the very outset.

The rib R1 of the waveguiding layer W is produced by etching this waveguiding layer wS thinner outside the region of the rib R1.

In the case of FIG. 3b, a cover layer DS is applied onto the waveguiding layer wS after the rib R1 is applied, for example, by epitaxy. This cover layer DS, for example, can be composed of the same material as the substrate S.

In the embodiment of FIG. 3c, one can proceed such that the planar, waveguiding layer wS is etched away except for a strip having the width b. One can also proceed such that only a strip-shaped, waveguiding layer having the width b is produced from the very outset, and thus the waveguiding layer is omitted outside of this strip from the very outset. The strip-shaped, waveguiding layer wS which is produced is covered with a cover layer that, for example, can be composed of the material of the substrate S and can be epitaxially produced. It is assumed in FIG. 3c that the cover layer and the substrate S are composed of the same material, whereby the boundary between the cover layer and the substrate is omitted. The cover layer can also be omitted, so that the strip-shaped, waveguiding layer wS is then adjacent air above the substrate S.

The embodiment of FIG. 3d is produced, for example, such that the spacer layer AS is etched thinner outside the region of the rib R, whereby this layer AS forms the further layer aS.

Although various minor changes and modifications might be proposed by those skilled in the art, it will be understood that we wish to include within the claims of the patent warranted hereon all such changes and modifications as reasonably come within our contribution to the art.

We claim as our invention:

1. A controllable integrated optical Mach-Zehnder interferometer, comprising:
    a substrate of semiconductor material;
    first and second strip waveguides of a defined width integrated on the substrate and defined by waveguiding layers at the substrate;
    in two coupling sections, the strip waveguides proceeding side-by-side and at a spacing from one another which is sufficiently small such that an optical wave guided in the waveguiding layer of one of the strip waveguides can couple over into the waveguiding layer of the other strip waveguide;
    in a phase shifting section, the two waveguides being in side-by-side relationship and at a spacing which is sufficiently great such that an over-coupling of optical waves between the two strip waveguides is substantially prevented;

in said phase shifting section at least one of the strip waveguides having a rib of semiconductor material and a spacer layer arranged over its waveguiding layer and which defines a width of the at least one strip waveguide where the rib is present;

a semiconductor junction which is electrically controllable via contacts is integrated within said phase shifting section in a region of said rib of said at least one strip waveguide such that a transition from p-doped material of said rib to n-doped or undoped material of said spacer layer is arranged at a specified distance from the waveguiding layer at a side facing the p-doped material, and wherein the rib of p-doped material is situated at a side of this transition facing away from the waveguiding layer;

the section of the strip waveguide within the phase shifting section which is adjacent the semiconductor junction comprising an electrically controllable strip waveguide section; and sections of the strip waveguides situated outside of the electrically controllable strip waveguide section forming passive strip waveguides which are free of semiconductor junctions.

2. An interferometer according to claim 1 wherein the phase shifting section is positioned between the two coupling sections.

3. An interferometer according to claim 1 wherein the spacer layer has a refractive index lower than a refractive index of the adjacent waveguiding layer.

4. An interferometer according to claim 1 wherein the spacer layer comprises undoped material.

5. An interferometer according to claim 1 wherein the spacer layer comprises n-doped material.

6. An interferometer according to claim 1 wherein the semiconductor junction comprises a pn-junction.

7. An interferometer according to claim 1 wherein the semiconductor junction comprises a pin-junction.

8. An interferometer according to claim 1 wherein the waveguiding layer of the substrate comprises undoped semiconductor material.

9. An interferometer according to claim 1 wherein the waveguiding layer of the substrate comprises n-doped semiconductor material.

10. An interferometer according to claim 1 wherein said passive strip waveguide sections which are free of pn- and pin-junctions comprise a strip-shaped waveguiding layer whose width defines a width of the passive strip waveguide, and wherein this striped-shaped waveguiding layer is contacted by the substrate has a uniform material at one side and another uniform material at the other side.

11. An interferometer according to claim 10 wherein said another uniform material at the other side is a material which is the same as the uniform material of the substrate.

12. An interferometer according to claim 1 wherein the strip waveguide sections which are free of pn- or pin-junctions comprises a strip-shaped waveguiding layer whose width defines a width of the passive strip waveguide and wherein this strip-shaped waveguiding layer is surrounded by the substrate.

13. A controllable integrated optical Mach-Zehnder interferometer, comprising:

a substrate of semiconductor material;

first and second strip waveguides of a defined width integrated on the substrate and defined by waveguiding layers at the substrate;

in two coupling sections, the strip waveguides proceeding side-by-side and at a spacing from one another which is sufficiently small such that an optical wave guided in the waveguiding layer of one of the strip waveguides can couple over into the waveguiding layer of the other strip waveguide;

in a phase shifting section, the two waveguides being in side-by-side relationship and at a spacing which is sufficiently great such that an over-coupling of optical waves between the two strip waveguides is substantially prevented;

in said phase shifting section at least one of the strip waveguides having a rib of semiconductor material and a spacer layer arranged over its waveguiding layer and which defines a width of the at least one strip waveguide where the rib is present;

a semiconductor junction which is electrically controllable via contacts is integrated within said phase shifting section in a region of said rib of said at least one strip waveguide such that a transition from p-doped material of said rib to n-doped or undoped material of said spacer layer is arranged at a specified distance from the waveguiding layer, and wherein the rib of p-doped material is situated at a side of this transition facing away from the waveguiding layer;

the section of the strip waveguide within the phase shifting section which is adjacent the semiconductor junction comprising an electrically controllable strip waveguide section;

sections of the strip waveguides situated outside of the electrically controllable strip waveguide section forming passive strip waveguides which are free of semiconductor junctions; and said passive strip waveguide sections which are free of pn- or pin-junctions comprising a rib forming a thicker region of the waveguiding layer, a width of said rib defining a width of the passive strip waveguide, and wherein on a side facing away from the substrate the surface of the waveguiding layer with the rib is in direct contact with a uniform material.

14. An interferometer according to claim 13 wherein the uniform material comprises air.

15. A controllable integrated optical Mach-Zehnder interferometer, comprising:

a substrate of semiconductor material;

first and second strip waveguides of a defined width integrated on the substrate and defined by waveguiding layers at the substrate;

in two coupling sections, the strip waveguides proceeding side-by-side and at a spacing from one another which is sufficiently small such that an optical wave guided in the waveguiding layer of one of the strip waveguides can couple over into the waveguiding layer of the other strip waveguide;

in a phase shifting section, the two waveguides being in side-by-side relationship and at a spacing which is sufficiently great such that an over-coupling of optical waves between the two strip waveguides is substantially prevented;

in said phase shifting section at least one of the strip waveguides having a rib of semiconductor material and a spacer layer arranged over its waveguiding layer and which defines a width of the at least one strip waveguide where the rib is present;

a semiconductor junction which is electrically controllable via contacts is integrated within said phase shifting section in a region of said rib of said at least one strip waveguide such that a transition from p-doped material of said rib to n-doped or undoped material of said spacer layer is arranged at a specified distance from the waveguiding layer, and wherein the rib of p-doped material is situated at a side of this transition facing away from the waveguiding layer;

the section of the strip waveguide within the phase shifting section which is adjacent the semiconductor junction comprising an electrically controllable strip waveguide section;

sections of the strip waveguides situated outside of the electrically controllable strip waveguide section forming passive strip waveguides which are free of semiconductor junctions; and the strip waveguide sections free of pn- and pin-junctions comprising a rib forming a thick region of a further layer formed of a uniform material which is arranged on and over the waveguiding layer, a width of said rib defining a width of the passive strip waveguide, and wherein the further layer has a surface facing away from the waveguiding layer which is adjacent to a uniform material.

16. An interferometer according to claim 15 wherein the uniform material adjacent the further layer surface facing away from the waveguiding layer comprises air.

17. A controllable integrated optical Mach-Zehnder interferometer, comprising:

a substrate of semiconductor material;

first and second strip waveguides of a defined width integrated on the substrate and defined by waveguiding layers at the substrate;

in two coupling sections, the strip waveguides proceeding side-by-side and at a spacing from one another which is sufficiently small such that an optical wave guided in the waveguiding layer of one of the strip waveguides can couple over into the waveguiding layer of the other strip waveguide;

in a phase shifting section, the two waveguides being in side-by-side relationship and at a spacing which is sufficiently great such that an over-coupling of optical waves between the two strip waveguides is substantially prevented;

in said phase shifting section at least one of the strip waveguides having a rib of semiconductor material arranged over its waveguiding layer;

a semiconductor junction which is electrically controllable via contacts is integrated within said phase shifting section in a region of said rib of said at least one strip waveguide spaced from a side of the waveguiding layer facing the rib;

the section of the strip waveguide within the phase shifting section which is adjacent the semiconductor junction comprising an electrically controllable strip waveguide section; and sections of the strip waveguides situated outside of the electric controllable strip waveguide section forming passive strip waveguides which are free of semiconductor junctions.

* * * * *